United States Patent [19]

Coburn

[11] Patent Number: 4,476,758
[45] Date of Patent: Oct. 16, 1984

[54] AUTOMATIC SLITTER SCORER WITH WEB SUPPORT

[75] Inventor: Robert E. Coburn, Warminster, Pa.

[73] Assignee: Molins Machine Company, Inc., Cherry Hill, N.J.

[21] Appl. No.: 299,354

[22] Filed: Sep. 4, 1981

[51] Int. Cl.³ .......................... B26D 3/08; B26D 11/00
[52] U.S. Cl. ............................... 83/479; 83/492; 83/106; 271/279; 493/342
[58] Field of Search .............. 83/479, 100, 425.4, 83/106, 165, 492; 271/64; 493/342, 370, 365, 363

[56] References Cited

U.S. PATENT DOCUMENTS

| | | | |
|---|---|---|---|
| 3,831,929 | 8/1974 | Hellmer | 83/479 |
| 3,961,547 | 6/1976 | Shainberg et al. | 83/479 |
| 4,214,495 | 7/1980 | Coburn | 83/425.4 |
| 4,215,609 | 8/1980 | Coburn et al. | 83/492 |
| 4,242,934 | 1/1981 | Coburn | 83/100 |
| 4,328,727 | 5/1982 | Tokuno | 83/479 |

Primary Examiner—Donald R. Schran
Attorney, Agent, or Firm—Seidel, Gonda & Goldhammer

[57] ABSTRACT

A slitter scorer having upper and lower web paths is provided with suction trim means along opposite edges of a web to be processed. Adjacent each suction trim means, and associated with each of said paths, there is provided a web deflecting means for flattening a web.

8 Claims, 6 Drawing Figures

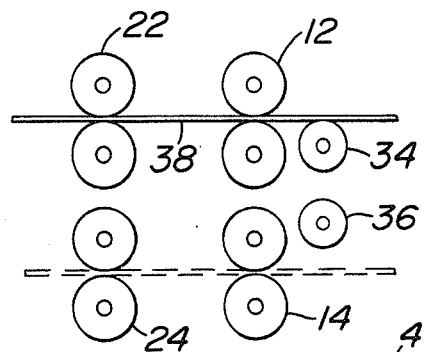
FIG. 2A
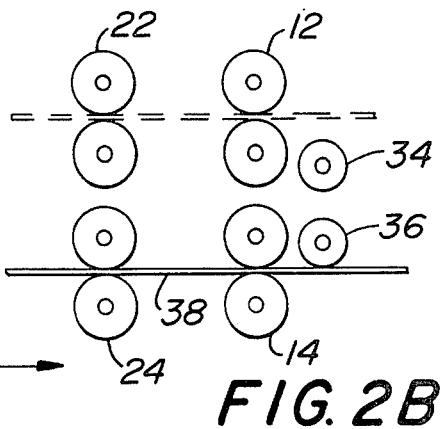
FIG. 2B
FIG. 3A
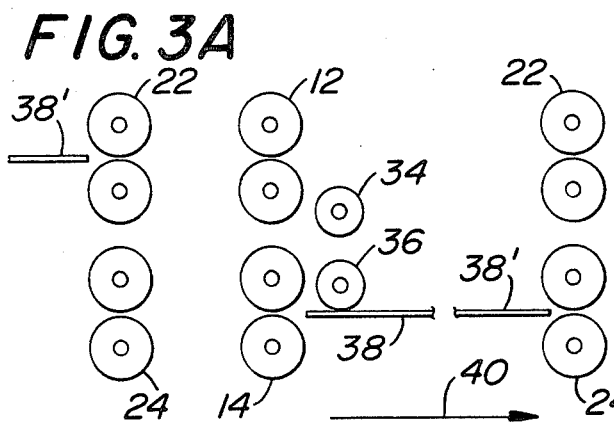
FIG. 3B
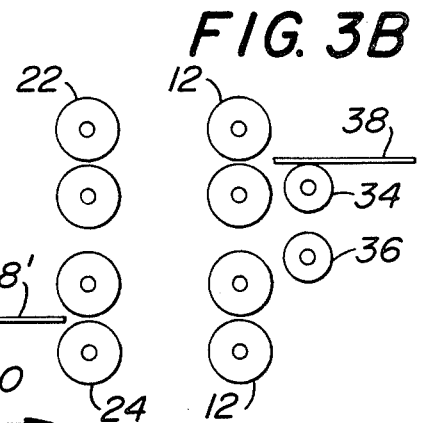
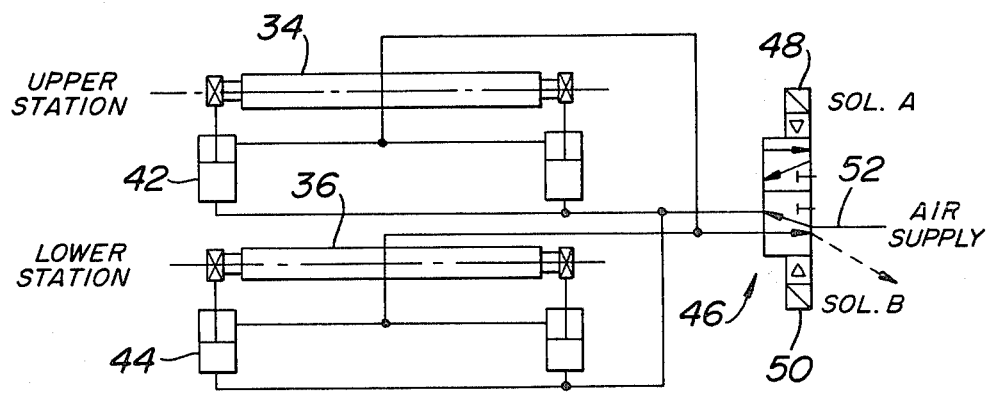
FIG. 4

AUTOMATIC SLITTER SCORER WITH WEB SUPPORT

BACKGROUND

This invention pertains to a web processing machine, and more particularly, to a slitter scorer of the general type described in U.S. Pat. Nos. 4,214,495; 4,215,609 and 4,242,934. In addition to slitting and scoring a moving web into two or more narrow webs, the apparatus of said patents also can process mill run board. Mill run board is corrugated paper board which has not been slit or scored but is trimmed only along its edges to a preselected width. In an automatic slitter scorer wherein slitter knives are set electronically without direct operator intervention, a problem has been encountered when producing mill run board. The problem is that the mill run board which has been trimmed has a finished width which is greater than the preselected width at which the knives were set.

The present invention is directed to a solution of the problem of obtaining trimmed mill run board of a preselected width. I noted that the mill run board does not remain flat while being trimmed. While traveling along the upper web path the mill run board sags in the center. On the other hand, when mill run board travels along the lower web path, the center of the web bows upward.

This phenonemon is believed to be caused by the disposition of the trim chutes. Because of space limitations the vacuum trim chute for the upper web path is placed above a web support table located adjacent the downstream end of the slitter scorer and the vacuum trim chute for the lower web path is placed below a web support table. The suction from the upper trim chutes exerts an upward force on the ends of the web while the suction from the lower trim chutes exerts a downward force on the ends of the web. The centers of the webs react in a direction opposite to these forces.

SUMMARY OF THE INVENTION

The present invention is directed to a web processing machine having an upper web path and a lower web path while being constructed in a manner so as to solve the problem of obtaining trimmed webs which are of a preselected width when slitter knives are set mechanically through electronic controls.

The upper and lower web paths are used alternately. A web deflector is provided for each path. The web deflectors are selectively and alternately moved between operative and inoperative positions depending upon which web path contains the moving web. Each web deflector is positioned to flatten out the web associated with its web path.

For the purpose of illustrating the invention, there is shown in the drawings a form which is presently preferred; it being understood, however, that this invention is not limited to the precise arrangements and instrumentalities shown.

FIG. 2A is a diagramatic illustration of a web traveling along an upper path of the slitter scorer.

FIG. 2B is the same as FIG. 2A but showing the web traveling along the lower web path.

FIG. 3A is a diagramatic illustration of the upper and lower web paths during an order change from the lower web path to the upper web path.

FIG. 3B is a view similar to FIG. 3A but showing the position of elements when the order change is from the upper web path to the lower web path.

FIG. 4 is a schematic of the web deflectors and associated circuitry.

DETAILED DESCRIPTION OF THE INVENTION

Figure 1:
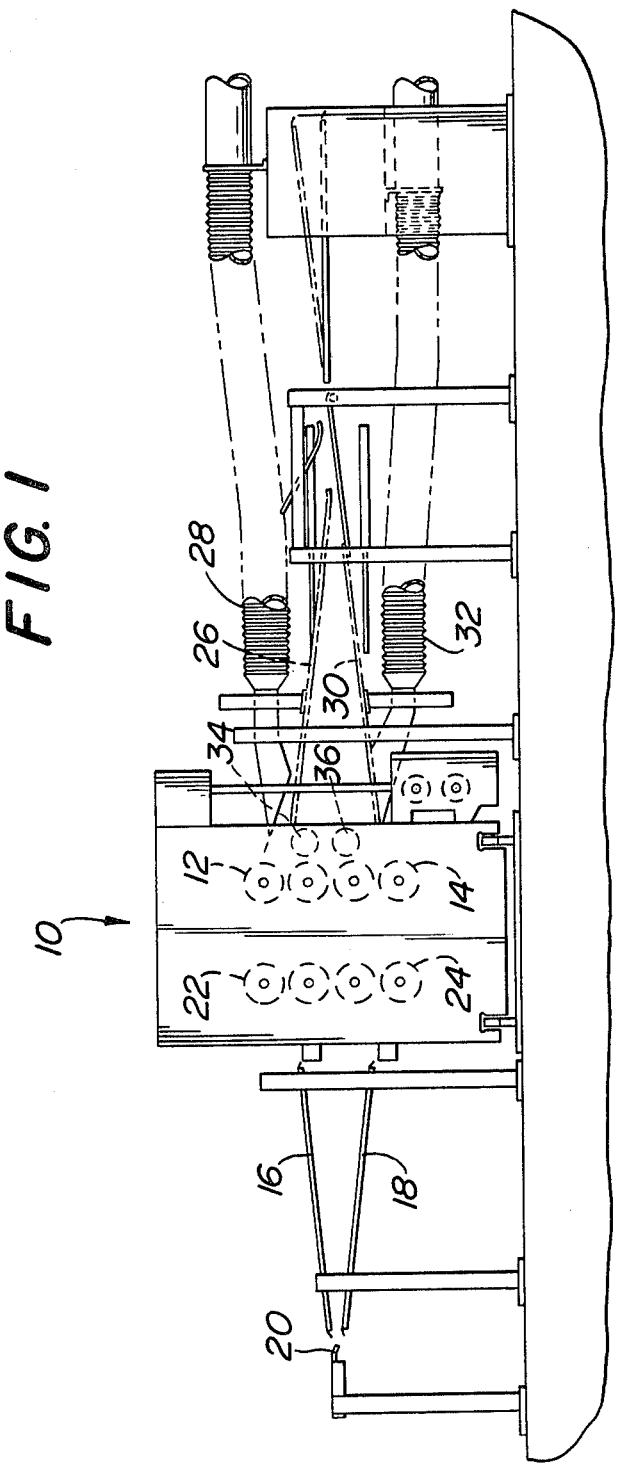
FIG. 1 is a side elevation view of an automatic slitter scorer.

Referring to the drawing in detail, wherein like numerals indicate like elements, there is shown in FIG. 1 a side elevation view of an automatic slitter scorer designated generally as 10. The slitter scorer 10 has mating sets of upper slitter blades 12 defining an upper flow path and mating sets of the lower slitter blades 14 defining a lower path. The blades are at spaced points along horizontally disposed shafts. A web may be directed by the feed plate 20 to the upper support 16 for directing the web to the upper path or to the lower support 18 when directing the web to the lower path.

When the web processing machine is both a slitter and scorer, there is preferably provided mating scorer blades 22 for the upper path and mating scorer blades 24 for the lower path. Immediately downstream from the upper path, there is provided an upper web table 26. Adjacent the leading edge of the table 26 there is provided an inlet to the suction trim chute 28. Below the table 26 there is provided a lower web table 30. Adjacent the leading edge of table 30, there is provided the inlet to a suction trim chute 32. Downstream from the tables 26, 30 the web is processed in a conventional manner.

The upper path defined by blades 12 and/or blades 22 is provided at its downstream end with an upper web deflector 34. It will be noted that deflector 34 is tangent to the bottom surface of the web 38 while the web 38 is moving along the upper path in a direction of arrow 40 as shown in FIG. 2A. As shown in FIG. 2B deflector 34 is at a lower elevation when the web 38 is being processed by the lower path. Conversely, the downstream end of the lower path is provided with a web deflector 36 which is at an elevated or inoperative position in FIG. 2A while the web 38 is being processed on the upper path. When the web 38 is being processed along the lower path as shown in FIG. 2B, the lower web deflector 36 is in a lower position which is an operative position with its surface tangent to the web 38 therebelow.

Since the upper web deflector 34 contacts the lower surface of the web 38 while the web 38 is being processed along the upper path, deflector 34 prevents the web 38 from sagging. Since the lower web deflector 36 contacts the upper surface of the web 38 when the web 38 is being processed along the lower path, it prevents the center portion of the web 38 from bowing upwardly. Thus, each of the deflectors 34, 36 assists alternately in flattening the web 38 whenever the web 38 is being processed by the associated web path.

Referring to FIG. 3A, wherein the web 38 is being processed by the lower web path, during an order change the web deflector 34 remains in its lower or inoperative position as shown in FIG. 3A until the leading edge of the new web portion 38' moves past the same. As shown more clearly in FIG. 3B, when processing an order change from the upper to the lower path, the web deflector 36 remains in its upper or inoperative position until the leading edge of the web portion 38' moves past the same.

The web deflectors 34, 36 are preferably rollers supported at their ends by bearings and guided for vertical reciprocation between operative and inoperative positions. A preferred arrangement for the deflectors 34, 36 so that they are alternately in the operative and inoperative positions is shown in FIG. 4. The upper deflector 34 is connected by way of a piston rod and piston to cylinders 42 therebelow. Deflector 36 is similarly connected to cylinders 44 therebelow. The opposite ends of the cylinders 42, 44 are connected by conduits as shown in FIG. 4 to a supply and exhaust valve 46. Valve 46 preferably has an upper solenoid 48 and a lower solenoid 50 for shifting a valving member with respect to an air supply conduit 52. Various other arrangements may be provided to assure that the deflector 34 is in its upper operative position when deflector 36 is in its upper inoperative position and visa versa.

The present invention may be embodied in other specific forms without departing from the spirit or essential attributes thereof and, accordingly, reference should be made to the appended claims, rather than to the foregoing specification, as indicating the scope of the invention.

I claim:

1. A bi-level slitter scorer system for operating on a moving web of mill run corrugated paperboard comprising means for shearing the web transversely into a leading portion and a trailing portion, means downstream from said shearing means for selectively guiding the moving web to either the upper level of a slitter scorer or the lower level of a slitter socrer, a slitter scorer adjacent said guiding means for receiving a web therefrom, said slitter scorer having at least one pair of shafts defining an upper web path and at least one pair of shafts defining a lower web path, at least one pair of tools on each of said pairs of shafts for operating on a web, an upper support table downstream from said slitter scorer for supporting a web traveling along the upper web path, a lower support table down-supporting a web traveling along said lower web path, means upstream of the leading edge of said upper support table for flattening the center portion of a web traveling on the upper web path to prevent the web center portion from sagging, means upstream of the leading edge of said lower table for flattening the center portion of a web traveling on said lower web path to prevent upward bowing of the web center portion, means for reciprocating said upper flattening means relative to the upper web path, means for reciprocating said lower flattening means relative to the lower web path, and actuating means associated with said upper and said lower flattening means for reciprocating the same as a unit whereby one flattening means is in an operative position while the other is in an inoperative position.

2. A slitter scorer in accordance with claim 1 wherein each flattening means is a freely rotatable roller having an operative position wherein its outer periphery is tangent to a surface of a web traveling along the associated web path.

3. A slitter scorer in accordance with claim 2 wherein the periphery of the upper flattening means when in an operative position is tangent to the lower surface of a web traveling on the upper web path and the periphery of the lower flattening means when in an operative position is tangent to the upper surface of a web traveling on the lower web path.

4. A slitter scorer system in accordance with claim 1 wherein each flattening means is downstream of at least some of said tools.

5. A slitter scorer system in accordance with claim 1 wherein said pair of tools comprises a pair of slitter knives for trimming an edge of the mill run corrugated paperboard.

6. In a web processing machine having upper and lower web paths, each path being defined by at least one pair of shafts, each pair of shafts having mating pairs of tools, an upper web path deflecting means mounted adjacent the upper web path for flattening a web traveling on the upper web path, a lower web path deflecting means mounted adjacent the lower web path for flattening a web traveling on the lower web path, means associated with each web deflecting means for reciprocating the same relative to its associated web path between operative and inoperative positions located between said paths, and a web support table associated with each web path, the upstream end of each web support table being adjacent one of said web deflecting means when the latter is in its operative position.

7. In a machine in accordance with claim 6 wherein the upper web deflecting means is a freely rotatable roller positioned to that its periphery when in the operative position is tangent to the lower surface of a web traveling on said upper web path, and said lower web deflecting means being a freely rotatable roller positioned so that its periphery when in the operative position is tangent to the upper surface of a web traveling on the lower web path.

8. A machine in accordance with claim 7 including actuating means for reciprocating said web deflecting means so that each such web deflecting means is alternately juxtaposed to its associated web path.

* * * * *